(No Model.)

J. L. MOTT, Jr.
PIGEON TRAP.

No. 584,596.   Patented June 15, 1897.

Witnesses:
J. Staib
Chas. H. Smith

Inventor:
Jordan L. Mott Jr.
per L. W. Serrell & Son
Attys.

UNITED STATES PATENT OFFICE.

JORDAN L. MOTT, JR., OF NEW YORK, N. Y.

PIGEON-TRAP.

SPECIFICATION forming part of Letters Patent No. 584,596, dated June 15, 1897.

Application filed February 4, 1897. Serial No. 621,921. (No model.)

*To all whom it may concern:*

Be it known that I, JORDAN L. MOTT, Jr., a citizen of the United States, residing in the city, county, and State of New York, have invented an Improvement in Pigeon-Traps, of which the following is a specification.

In Letters Patent No. 544,186, granted to me August 6, 1895, a trap is represented in which a hood is fitted to be swung from a box over a bird, such as a pigeon, to inclose the same or to uncover the bird and produce a noise or concussion, causing the bird to fly up from the top of the box upon which it has been placed.

It is often found advantageous to be able to introduce the bird from below the box, so that a person located in a pit may place the bird in position with rapidity and without being exposed to risk or danger. With this object in view a hood is made of the general character represented in the aforesaid patent, and a pivoted plate is used in the bottom of the hood, the same being advantageously pivoted upon the same bearings as the hood and counterpoised, so that one end of the hood-bottom can be swung down and the bird inserted from below and then the hood-bottom returned to a normal position by the counterpoise; and in addition to the foregoing I make use of spring-disturbers, which are acted upon by the movement of the hood and are closely adjacent to the bird, so that as the hood is swung to liberate the bird the disturbers are set in motion closely adjacent to such bird, so that it will start to fly immediately that the hood uncovers said bird; and these disturbers are advantageously provided with bells or rattles and with pieces of colored cloth, so that the agitation of the disturbers not only makes a noise, but the pieces of colored cloth are floated or shaken closely adjacent to the bird to insure the prompt and rapid flight of such bird.

Figure 1:
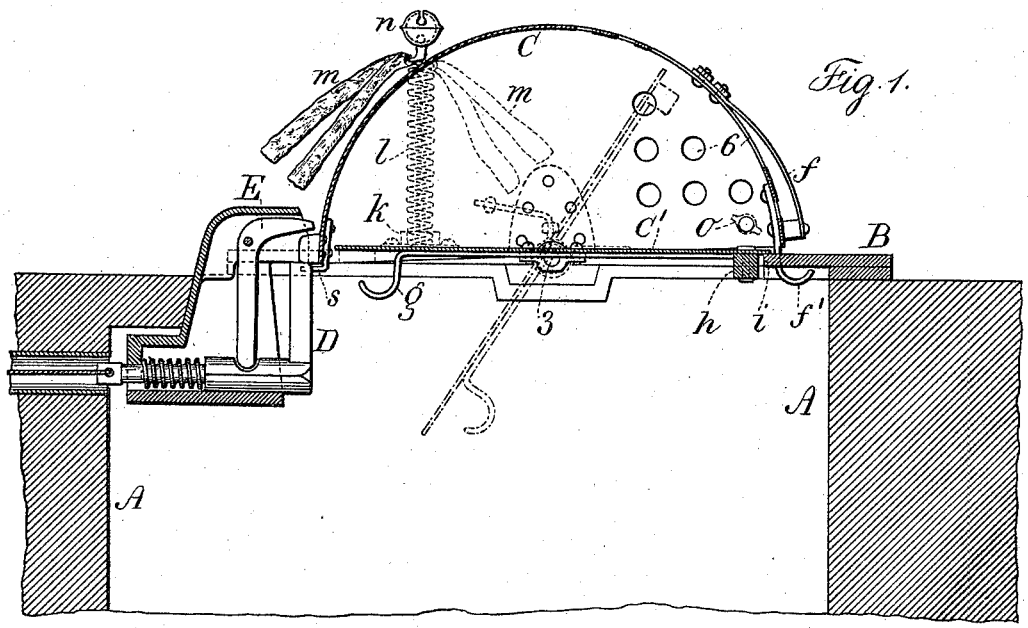
Figure 2:
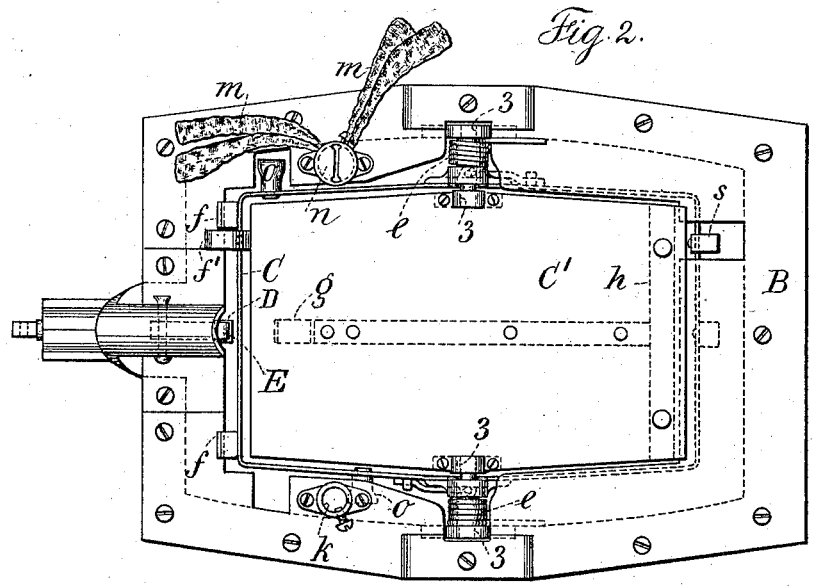

In the drawings, Figure 1 is a vertical section of the improvement, and Fig. 2 is a plan view with the hood drawn back.

The metal frame B is secured upon the top of a suitable foundation or inclosure A, forming a pit in which the attendant is to be located and provided with the proper supply of pigeons or other birds.

The frame B has a central opening sufficiently large for the hood C to be swung either upward or downward, as in the aforesaid patent, the hood being supported on the pivots 3, and this hood is advantageously made of sheet metal, with openings at 6 for light and ventilation, the circular portion of the hood that comes next to the sportsman being closed, so as to prevent stray shots reaching the bird while in the trap. The bolt D and pivoted finger E are similar to those in the aforesaid patent.

I prefer to make eyes upon the sides of the hood C to turn freely with or upon the pivot-pins 3 and to use coiled springs $e$ around such pivot-pins, with one end acting against the hood and the other against the plate B or against a collar around the pivot-pin, so that when the hood is liberated from the bolt D these coiled springs $e$ give a rapid movement to swing the hood backward and downward into the box and expose the bird, and in place of using latches, as in the aforesaid patent, I prefer to employ brake-springs $f$, which, rubbing against the inner edge of the frame B as the hood is swung downward and near the end of its movement, lessen the concussion and prevent injury to the parts.

The hood-bottom C' is pivoted, so that it can be swung freely to give access from below into the hood after the hood has been swung over into position. It is advantageous to pivot this hood-bottom upon the pivots 3, so that one end of the hood-bottom can swing freely around within the hood as the other end of such hood-bottom is pulled down by the finger-piece $g$, and it is advantageous to employ a counterweight $h$ sufficient to return the hood-bottom to its position and hold the same against the stop $i$, regardless of the position or weight of the bird upon the hood-bottom.

It will now be understood that when the hood has been swung down into the pit below the attendant can return it to position by pushing it up from below until the bolt D holds the same in position. The finger-piece $g$ can then be drawn down and the hood-bottom swung upon the pivots to enable the attendant to insert the bird from below with convenience, and then the hood-bottom is allowed to return by its counterweight into position with the bird upon the same, and when the trap is pulled the hood is unbolted, and the pivoted finger gives motion to the same in addition to the action of the coiled springs $e$, so that the hood is rapidly swung down into the pit and the bird uncovered, and the brake-springs $f$, rubbing against the inner edge of the frame B, arrest the movement of the hood as it approaches the extreme downward position, and the action of the hood is not interfered with in any respect by the hood-bottom being pivoted.

Upon the surface of the frame B sockets $k$ are placed, there being a clamping-screw for each socket, and the vertical springs $l$ are provided one for each socket. It is advantageous to make these springs as wire helices or coils, the lower end of each coil being clamped within a socket, and to the upper ends of these vertical springs strips of cloth or similar material, advantageously of a bright color, are attached, as shown at $m$, and rattles similar to sleigh-bells or similar devices for making a noise are provided, as at $n$, upon the upper ends of the vertical springs. These devices form disturbers, and I provide upon the sides of the hood fingers $o$, advantageously placed one in advance of the other, so that as the hood is swung upon its pivots first one finger acts and then the other against the disturbers to move the same, and then to allow the spring to slip past the finger and agitate the disturbers violently. These disturbers may be of any desired number and act in succession, so that the bird is started by the suddenness of the swinging of the hood and the noise and agitation of the disturbers. The fingers $o$ should be beveled in opposite directions at the ends, so as to slip past the disturbers when the hood is being returned over the hood-bottom and also when the hood is being swung away and the disturbers agitated.

It is to be understood that in the frame B notches are to be provided in the proper places for allowing the fingers $o$ to pass freely as the parts swing, and by providing a hook end $f'$ near one of the brake-springs $f$ the hood can be swung over conveniently from above whenever desired, and the frame B should be notched to allow this hook to pass below the surface of the frame as the hood is swung into its normal position for use. A stop may be provided at $s$ to limit the movement of the hood as it is closed.

I claim as my invention—

1. The combination with the pivoted hood for covering a pigeon or other bird, of a pivoted hood-bottom adapted to be swung from below to allow a bird to be passed up above the bottom and within the hood, substantially as set forth.

2. The combination with a frame, of a hood and pivots for connecting the hood to the frame, a hood-bottom adapted to swing on the same pivots as the hood, and a stop for limiting the movements of the hood-bottom when in position for use, substantially as set forth.

3. The combination with the frame, of a hood and pivots for connecting the hood to the frame, a hood-bottom adapted to swing on the same pivots as the hood, and a stop for limiting the movements of the hood-bottom when in position for use, a counterpoise for holding the hood-bottom in position and a finger-piece below the hood-bottom by which one end of the hood-bottom can be swung down for inserting the bird, substantially as set forth.

4. The combination with a frame and a pivoted hood adapted to cover a bird or to be swung down below the frame for uncovering the bird, of spring-disturbers and sockets upon the frame into which the lower ends of the spring-disturbers are secured and fingers upon the hood for moving the disturbers, substantially as set forth.

5. The combination with a frame and a pivoted hood adapted to cover a bird or to be swung down below the frame for uncovering the bird, of coiled-spring disturbers with sleigh-bells or similar noise-producing devices and sockets upon the frame into which the lower ends of the spring-disturbers are secured, and fingers upon the hood for moving the disturbers, substantially as set forth.

6. The combination with the frame and pivots, of a hood swinging upon the pivots, a bolt for holding the hood when in position for use, and springs acting upon the hood to turn the same when unbolted, and brake-springs upon the hood for arresting the hood near the end of its movement, substantially as set forth.

Signed by me this 1st day of February, 1897.

JORDAN L. MOTT, JR.

Witnesses:
K. I. MOTT,
DAVID THOMSON.